United States Patent
Stilwell, Jr. et al.

[11] Patent Number: 5,224,111
[45] Date of Patent: Jun. 29, 1993

[54] DUAL FIBER DRIVE SYSTEM

[75] Inventors: George R. Stilwell, Jr., Raleigh; James W. Sylivant, Apex, both of N.C.

[73] Assignee: International Business Machines Corporation, Armonk, N.Y.

[21] Appl. No.: 729,954

[22] Filed: Jul. 15, 1991

[51] Int. Cl.⁵ .............................................. H01S 3/00
[52] U.S. Cl. ........................................ 372/38; 372/29; 372/31
[58] Field of Search ................ 372/38, 8, 6, 50, 26, 372/31, 29

[56] References Cited

U.S. PATENT DOCUMENTS

| | | | |
|---|---|---|---|
| 4,603,421 | 7/1986 | Scifres et al. | 372/50 |
| 4,611,352 | 9/1986 | Fujito et al. | 372/38 |
| 4,856,011 | 8/1989 | Shimada et al. | 372/38 |
| 4,884,280 | 11/1989 | Kinoshita | 372/38 |
| 5,115,147 | 5/1992 | Kusano et al. | 372/38 |

Primary Examiner—Georgia Y. Epps
Attorney, Agent, or Firm—Joscelyn G. Cockburn

[57] ABSTRACT

A laser source suitable for driving single mode and multimode fiber communication lines. The driver circuit includes a photo diode that, in multimode operation, responds to the laser light and causes the laser's output amplitude and wavelength to rapidly fluctuate thus producing the incoherent light required to drive multimode fiber. In single mode operation, the photo diode is disabled and the laser produces the requisite coherent light.

13 Claims, 1 Drawing Sheet

DUAL FIBER DRIVE SYSTEM

FIELD OF THE INVENTION

This invention relates to digital optical communication systems including local area network products, and in particular, to a laser driver that will economically and effectively provide light drive to either single mode or multimode fiber optic cables.

BACKGROUND OF THE INVENTION

Digital optical communication systems, such as local area networks, may utilize either single mode or multimode fiber optic links as transmission media. Single mode fiber, primarily used for long-haul transmission, has a very small core and usually requires coherent light for input signals because of the very small aperture of the fiber and the need to capture enough light. This is particularly important where there is a high data transmission rate over a long distance, and the added chromatic dispersion of the broadened spectrum from the light source is detrimental to the system. Coherent light is the normal line spectrum of a laser; a light-emitting diode (LED) could not provide sufficient optical power for high speed, long distance transmission through single mode fiber.

Multimode fiber, commonly used for short-haul transmission, has a much larger core than single mode through which multiple modes of light can pass. In order to avoid the problem of modal noise, multimode fiber requires incoherent light which is usually produced by LEDs. Modal noise results from the interference of pulses of coherent light with one another over the length of the fiber cable. The coherency of laser light can be destroyed by changing the index of refraction of the laser cavity, which in turn shifts the wavelength slightly such that the normal line spectrum of the laser is blurred. This invention provides a means of using a laser and a minimal circuit to produce the coherent light needed for single mode fiber or the incoherent light required for multimode fiber.

The known prior art that utilizes a laser as a source of incoherent light for multimode fiber employs additional components not included in the present invention. In U.S. Pat. No. 4,317,236, a separate microwave oscillator is used to destroy the coherency of laser light, in order to reduce the modal noise in multimode fiber. The connection between the oscillator and the laser current driver can lead to electromagnetic interference problems. Furthermore, the oscillator has its own timing device which may not correspond to the timing of the laser and will slow down the maximum data transmission rate. Use of the oscillator adds cost to such a laser driver.

Both a high frequency oscillator and an amplitude modulator are employed to destroy coherent light in U.S. Pat. No. 4,611,352, a device that performs long-haul transmission of a signal using a laser and multimode fiber. As compared to the present invention, the use of those components will increase cost and electromagnetic interference, while decreasing data transmission speed.

A third device in the relevant prior art, U.S. Pat. No. 4,603,421, is a multi-emitter laser that provides an incoherent composite laser input beam to multimode fiber in order to eliminate modal noise. Unlike the present invention, the emitter requires a special array laser coupled to the fiber to approximate an LED, and does not operate on single mode fiber.

OBJECT OF THE INVENTION

In view of the shortcomings of the prior art, it is a primary objective of this invention to drive both single mode fiber and multimode fiber using the same light source: a laser connected to a circuit that uses very few components. Such a device will be less expensive and will operate at a faster speed than previously-developed laser driver devices.

SUMMARY OF THE INVENTION

The foregoing object and others are achieved in the present invention through the use of: a standard laser with a PIN diode attached to its back facet; an open collector device that selects the mode of operation to match the type of fiber optic cable that the laser will drive; an open collector device for incoming data; and a circuit that will oscillate at a very high frequency, and thereby destroy the coherency of the laser light, when multimode fiber is used. When the transmission medium is single mode fiber, the circuit suppresses oscillation and coherent light will be produced.

DETAILED SPECIFICATION

Figure 1:
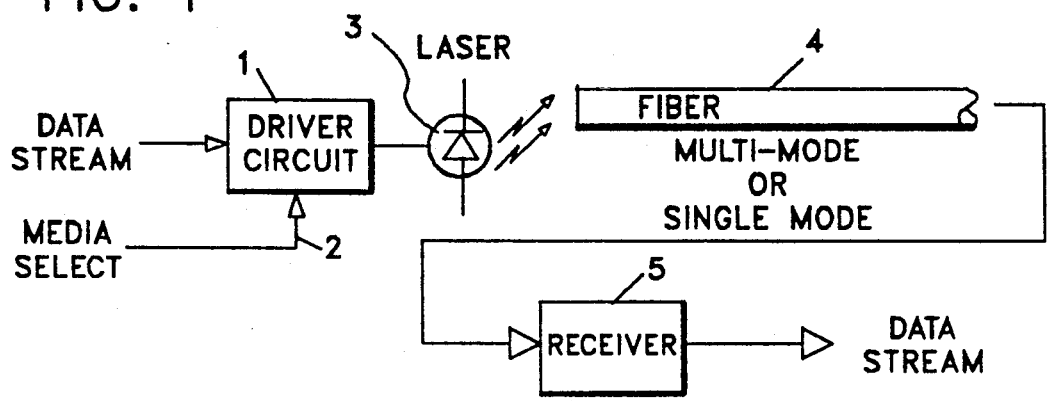
FIG. 1 is a block diagram illustrating a possible embodiment of the invention.

An embodiment of the invention is illustrated in FIG. 1. A data stream is applied to the driver circuit portion of the invention, 1. A media select line, 2, communicates to the circuit the type of fiber cable that is being used (single mode or multimode). The circuit drives a standard laser, 3, to produce either coherent light or incoherent light for the attached fiber cable, 4: coherent light for single mode fiber, incoherent light for multimode fiber. The optical signals transmitted through the fiber are typically converted to electrical signals at a receiver, 5.

Figure 2:
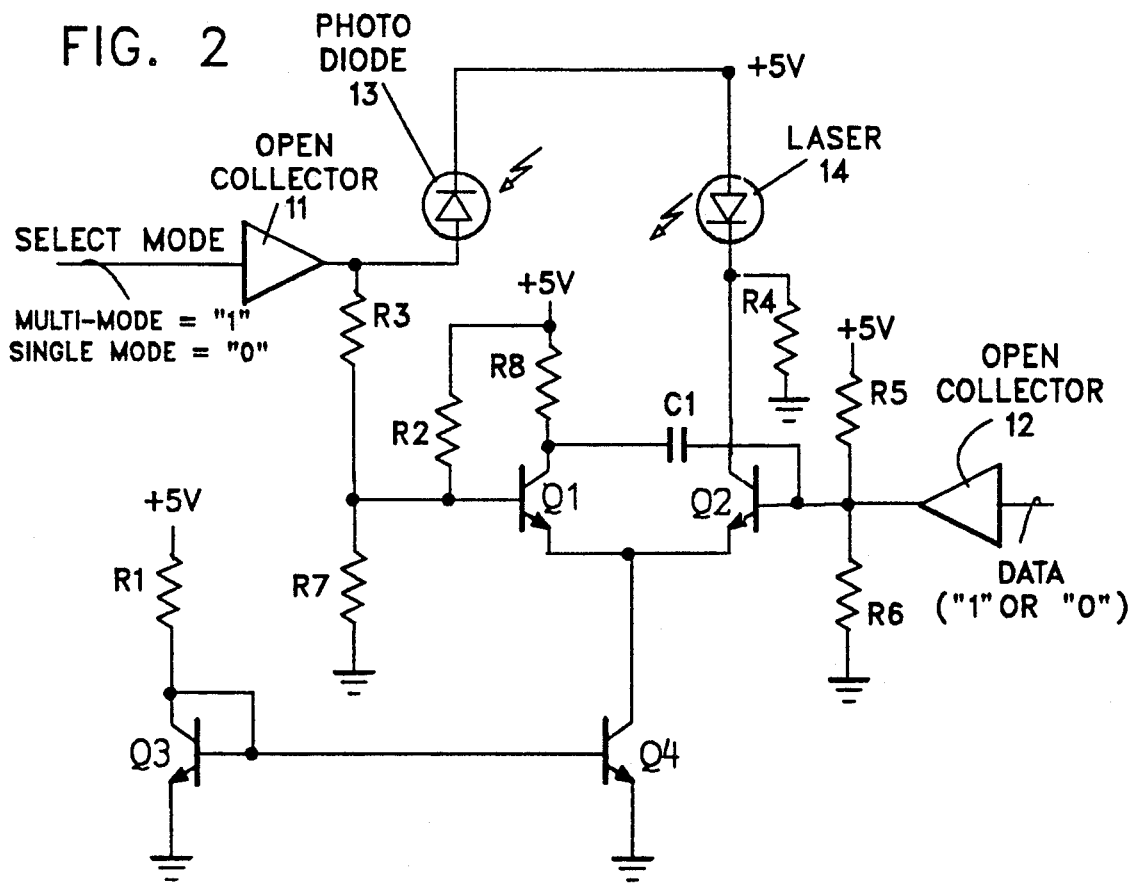
FIG. 2 is a circuit diagram illustrating details of the dual fiber drive system.

FIG. 2 illustrates the details of the laser driver circuit. The circuit includes two open collector devices, 11 and 12. Open collector device 11 determines whether the circuit will drive the laser for single mode fiber or multimode fiber. A logic "1" signal from the media select line is used for multimode, and a logic "0" signal for single mode. Open collector device 12 receives data. The circuit also includes resistors R1–R8, transistors Q1–Q4, capacitor C1, PIN photo diode 13, and standard laser 14.

Q3 and Q4 are identical transistors that form a mirrored constant current source for differential transistor pair Q1 and Q2.

When open collector device 11 receives a logic "0" signal, the circuit will operate for "single mode fiber." The end of resistor R3 attached to the open collector of device 11 will be grounded, as will the anode of photo diode 13. Thus, the photo diode current will be diverted to ground. A slightly positive reference voltage will be set at the base of transistor Q1 by resistors R2, R3, and R7. If the data received at open collector device 12 is a logic "1," a voltage will be set at the base of transistor Q2 by resistors R5 and R6 that is more positive than the reference voltage at the base of transistor Q1. As a result, Q2 will turn ON, which will enable all the current from the mirrored current source to pass through Q2 adding to the laser 14 current due to R4. The laser will produce the level of coherent light which represents a logic "1" state in single mode fiber.

With single mode fiber operation still selected and the data received at open collector device 12 is a logic "0," the base of transistor Q2 will be grounded, which turns Q2 OFF, and Q2 will block the flow of current to the laser. However, resistor R4 will provide residual bias current to the laser, the laser will produce a low level of light which represents logic 0 state. The residual bias current maintains the laser's active state so that high speed operation is possible.

When open collector device 11 receives a logic "1" signal, the circuit will operate in "multimode." Photo diode 13 will not be grounded and will inject current through R3. If the data received at open collector device 12 is a logic "1," transistor Q2 will turn ON, and the current from the mirrored constant current source will pass through Q2 to laser 14. When the laser emits light, a sample of the light will be detected by photo diode 13. The light will produce current that the photo diode will inject into resistor R3 and the base of transistor Q1 which will produce an increase in the reference voltage at Q1, and Q1 will turn ON. Current will be diverted from Q2 to Q1, and as the current flows through Q1, the voltage drop across resistor R8 will cause the collector voltage at Q1 to decrease. Capacitor C1 will couple this voltage to the base of Q2, which will assist in turning Q2 OFF; the positive feedback induced by C1 produces faster switching. With Q2 OFF, the flow of current from the mirrored constant current source to the laser will be blocked, and the laser will operate at a light level representing logic level "0". Consequently, photo diode 13 will detect minimal light and will inject negligible current into the base of Q1. The stored charge in the base of Q1 will be removed through resistor R7, and Q1 will turn OFF, causing Q2 to turn back ON. Once again, current will be able to flow to the laser, and the laser will operate at logic "1." This cycle repeats at a very high frequency equal to 1/(delay around the laser-diode/transistor loop). The rapid cycling destroys the coherence of the laser output; thus, producing the incoherent light required to drive multimode fiber.

If the circuit is operating for "multimode" fiber and the data received at open collector device 12 is a logic "0," the circuit will operate in the same manner as when logic "0" is received during "single mode" operation. Transistor Q2 will turn OFF, and will block the flow of current from the mirrored constant current source to the laser. The laser will produce the minimal light output representing logical state "0", due to the residual bias current from resistor R4.

As described, the present invention has the advantages of employing a single source to selectively produce either coherent or incoherent light to drive either single mode or multimode fiber. The invention consists of very few components, and supports high-speed data transmission. Note that these components can be integrated into a solid-state IC.

We claim:

1. An incoherent laser source suitable for driving multimode fiber communication lines comprising:
    a laser;
    a photo diode arranged in proximity to said laser and responsive to light emitted therefrom for producing current;
    first means responsive to a predetermined input signal for turning said laser on; and,
    second means responsive to current from said photo diode for turning said laser off as long as said photo diode provides current whereby said laser biases on and off as long as said predetermined input signal is present.

2. The incoherent laser source of claim 1 wherein the first means include an open collector device (12) responsive to incoming data signals; and
    a switching means (Q2) operatively coupling the open collector device to the laser.

3. The incoherent laser source of claim 2 wherein the switching means includes a transistor.

4. The incoherent laser source of claim 1 wherein the second means includes a reference voltage generating circuit arrangement which generates a reference voltage; and
    a third means for coupling the reference voltage to the first means.

5. The incoherent laser source of claim 4 wherein the reference voltage generating circuit arrangement includes a switching transistor (Q1);
    a first resistive means coupling a base electrode and a collector electrode of said switching transistor; and
    a second resistive means coupled to the base electrode of said transistor.

6. The incoherent laser source of claim 5 wherein the first resistive means includes a pair of resistors arranged in parallel.

7. The incoherent laser source of claim 5 wherein the second resistive means includes a pair of series connected resistors.

8. The incoherent laser source suitable for driving multimode fiber communication lines comprising:
    a laser;
    a photo diode arranged in proximity to said laser and responsive to light emitted therefrom for producing current;
    a constant current source;
    first transistor means having a collector connected to said laser and an emitter connected to said current source, and responsive to a predetermined input signal for turning said laser on; and,
    second transistor means having a collector connected to a bias voltage, an emitter connected to said current source, and a base connected to said photo diode, and that is responsive to current produced by said photo diode such that said current increases the reference voltage at the base of said transistor causing current to be diverted from said first transistor means,
wherein the first transistor means and said laser will bias off, until said photo diode ceases to produce current and said second transistor means biases off.

9. A laser source suitable for selectively driving single mode and multimode fiber communication lines comprising:
    a laser;
    a photo diode arranged in proximity to said laser and responsive to light emitted therefrom for producing current;
    first means for selectively biasing said photo diode off for single mode operation and on for multimode operation;
    second means responsive to a predetermined input signal for turning said laser on; and, third means responsive to current from said photo diode for turning said laser off as long as said photo diode provides current whereby said laser turns on and off as long as said predetermined input signal is present.

10. A laser source suitable for selectively driving single mode and multimode fiber communication lines comprising:
   a laser;
   a photo diode arranged in proximity to said laser and responsive to light emitted therefrom for producing current;
   first means for selectively biasing said photo diode off for single mode operation and on for multimode operation;
   a constant current source;
   first transistor means having a collector connected to said laser, an emitter connected to said current source, and a base responsive to a predetermined input signal for turning said laser on; and,
   second transistor means having a collector connected to a bias voltage, an emitter connected to said current source, and a base connected to said photo diode, and responsive to current from said photo diode when it detects light emitted by the laser for turning said laser off.

11. A laser device suitable for driving single mode fiber communications line comprising:
   a laser;
   a photo diode arranged in proximity to said laser and responsive to light emitted therefrom to produce current;
   first means for biasing said photo detector off for a single mode operation;
   a first switching means responsive to a predetermined input signal for turning said laser on; and
   a current source coupled to said first switching means.

12. A laser device suitable for driving a single mode fiber communication line or a multimode fiber communication line comprising:
   a laser;
   a photo diode arranged in proximity to said laser and responsive to light emitted therefrom to produce current;
   a first means for selectively biasing said photo diode into a first state for single mod operation and into a second state for multimode operation;
   a switching circuit means responsive to a predetermined input signal for turning the laser on; and
   a control circuit means interconnecting the switching circuit means and the photodetector; said control circuit means responsive to a photo detector current to oscillate at a relatively very high frequency that destroys the coherence of light outputted from said laser.

13. The laser device of claim 12 further including a current source coupled to the switching circuit means.

* * * * *